United States Patent [19]

Daugherty et al.

[11] 4,199,700

[45] Apr. 22, 1980

[54] PHASE LEAD FOR CONNECTING STATOR COILS AND PARALLEL PHASE RINGS

[75] Inventors: Roger H. Daugherty, Wilkinsburg; Warren W. Jones, Bullskin; Roger L. Swensrud, Plum Borough, all of Pa.

[73] Assignee: Westinghouse Electric Corp., Pittsburgh, Pa.

[21] Appl. No.: 929,587

[22] Filed: Jul. 31, 1978

[51] Int. Cl.² ............................................. H02K 11/00
[52] U.S. Cl. ..................................... 310/71; 310/59; 310/64; 310/260
[58] Field of Search ...................... 310/71, 52, 260, 53, 310/54, 57, 58, 60 R, 64, 65; 336/62; 339/112

[56] References Cited

U.S. PATENT DOCUMENTS

| 2,828,428 | 3/1958 | Baudry | 310/64 |
| 3,112,415 | 11/1963 | Bahn | 310/54 |
| 4,117,358 | 9/1978 | Flick | 310/59 |
| 4,140,934 | 2/1979 | Jager | 310/71 |

*Primary Examiner*—R. Skudy
*Attorney, Agent, or Firm*—J. W. Keen

[57] ABSTRACT

A dynamoelectric machine utilizing stiff, multiple component phase leads for connecting potentially misaligned stator coils and parallel phase rings. The phase leads, when attached to stator coil and phase ring coolant headers, provide electrical communication therebetween. The first and second phase lead components have a hole and cylindrical portion respectively wherein the cylindrical portion is insertable in the hole. Such phase lead hole has a longitudinal axis perpendicular to both slot elongation directions. Intimate electrical contact between the phase lead components and their connected coolant headers is insured by disposidng solder between their mateable, plane surfaces. Intimate electrical contact between the phase lead components is insured by brazing the components together at the interface between the assembled cylindrical portion and hole. Translational misalignment between the connectable phase ring and coil is accommodated in the three perpendicular directions by providing the slotted openings and permitting insertion of the cylindrical phase lead portion into the phase lead hole for selected distances. Such selective insertion is obtained by supplying extra stock to the cylindrical phase lead portion and trimming that portion to the appropriate length at assembly time.

5 Claims, 12 Drawing Figures

PHASE LEAD FOR CONNECTING STATOR COILS AND PARALLEL PHASE RINGS

BACKGROUND OF THE INVENTION

1. Field of the Invention

This invention relates to internally cooled windings and parallel phase lead rings of dynamoelectric machines, and more particularly, to means for electrically connecting stator coils to parallel phase lead rings.

2. Description of the Prior Art

Increased efficiency and economies of scale have historically resulted in demands for turbine generators of ever increasing rating. Such rating increases have, however, been accompanied by demands for maintenance of or even reduction in the physical size of the machines. Accomplishing such polarized objectives sometimes necessitated the use of liquid cooling in the turbine generator's stator coils. Parallel phase rings which provide electrical communication to the machine's external bushings have usually been cooled with gaseous coolant. However, the size limitations imposed on increasingly higher rated machines sometimes requires liquid cooling of the parallel phase rings. Phase leads provide electrical communication between the parallel rings and terminating portions of the stator coils. In the past flexible phase leads have been utilized to compensate for assembly misalignments between the phase lead connection points on the parallel phase rings and stator coils. It has been found, however, that flexible phase leads can have natural frequencies less than desired. Such natural frequencies can render the phase lead components vulnerable to excessive vibration and stress. Short, stiff phase leads with relatively high natural frequencies were thought to be unable to accomodate misalignment between the parallel phase rings and stator coils. Adequate sealing for liquid coolant flow through the phase leads provided an additional obstacle to liquid cooled phase leads. Such coolant sealing was not previously of great import since the gaseous coolant which formerly customarily cooled the phase leads would not contaminate or harm the generator's interior.

Thus, liquid cooling or stiff phase leads which would accommodate misalignments between the parallel phase rings and stator coils was desirable, but were believed difficult objectives to simultaneously attain.

SUMMARY OF THE INVENTION

In accordance with the present invention, an improved dynamoelectric machine is provided which utilizes short, stiff phase leads for connecting parallel phase rings to stator coils and accommodates assembly misalignment therebetween. The invention generally comprises a stator member, a plurality of electrical coils disposed in the stator member, a plurality of arcuate shaped phase lead ring members situated at one axial end of the stator, a plurality of coil headers connected to the coil's terminating ends for manifolding coolant through the coils, a plurality of ring member headers connected to the phase lead ring members for manifolding coolant through the rings, a plurality of two-component phase leads, and a plurality of fasteners for securing the phase lead components to the coil and phase ring headers.

The coil headers, ring member headers, and phase lead components have openings therein for receiving the fasteners. Each of the phase leads includes two components whose adjacent ends rotatably mate and whose distal ends have openings therein which are generally alignable with the openings in the connected coil and phase ring headers to form a first and second series of openings, respectively. At least one opening of each aligned pair is slotted with the slots in the coil header series of openings being elongated in a direction perpendicular to the phase lead component's rotational axis and the slots in the parallel phase ring headers being elongated in a direction perpendicular to the phase lead components' rotational axis and the coil header's slot elongation direction. The phase lead components mate with the respective headers along plane surfaces perpendicular to the longitudinal axes of the alignable openings therein. In a preferred embodiment of the invention solder or other metallurgical bond is applied between the plane surfaces of the headers and the plane, surfaces of the phase lead components mateable therewith. Such metallurgical bonding insures optimum electrical contact therebetween. The mateable openings are larger than the fasteners to be received therein so as to permit rotation of the phase lead components relative to their connected coil and parallel phase ring headers. The perpendicularly arranged slots and relatively rotatable phase lead components provide three translational degrees of freedom and three rotational degrees of freedom so as to compensate for and accommodate assembly misalignment between the connectable stator coils and parallel phase rings. The two phase lead components are stiff to insure high natural frequencies and are relatively short to facilitate heat conduction to the coolant circulating past its ends through the coil and phase ring headers. The rotatably mateable phase lead components have a hole disposed on one component and a cylindrical portion disposed on the other component with the cylindrical portion being insertable in the hole after it has been appropriately trimmed at assembly time to match the actual separation distance between the coil and parallel phase ring.

BRIEF DESCRIPTION OF THE DRAWINGS

The invention will be more fully understood from the following detail description of a preferred embodiment, taken in connection with the accompanying drawings, in which.

DESCRIPTION OF THE PREFERRED EMBODIMENT

The present invention is concerned primarily with phase leads for the windings of dynamoelectric machines. Accordingly, in the description which follows the invention is shown embodied in a large liquid cooled turbine generator. It should be understood, however, that the invention may be utilized as a phase lead in any dynamoelectric machine.

Figure 1:
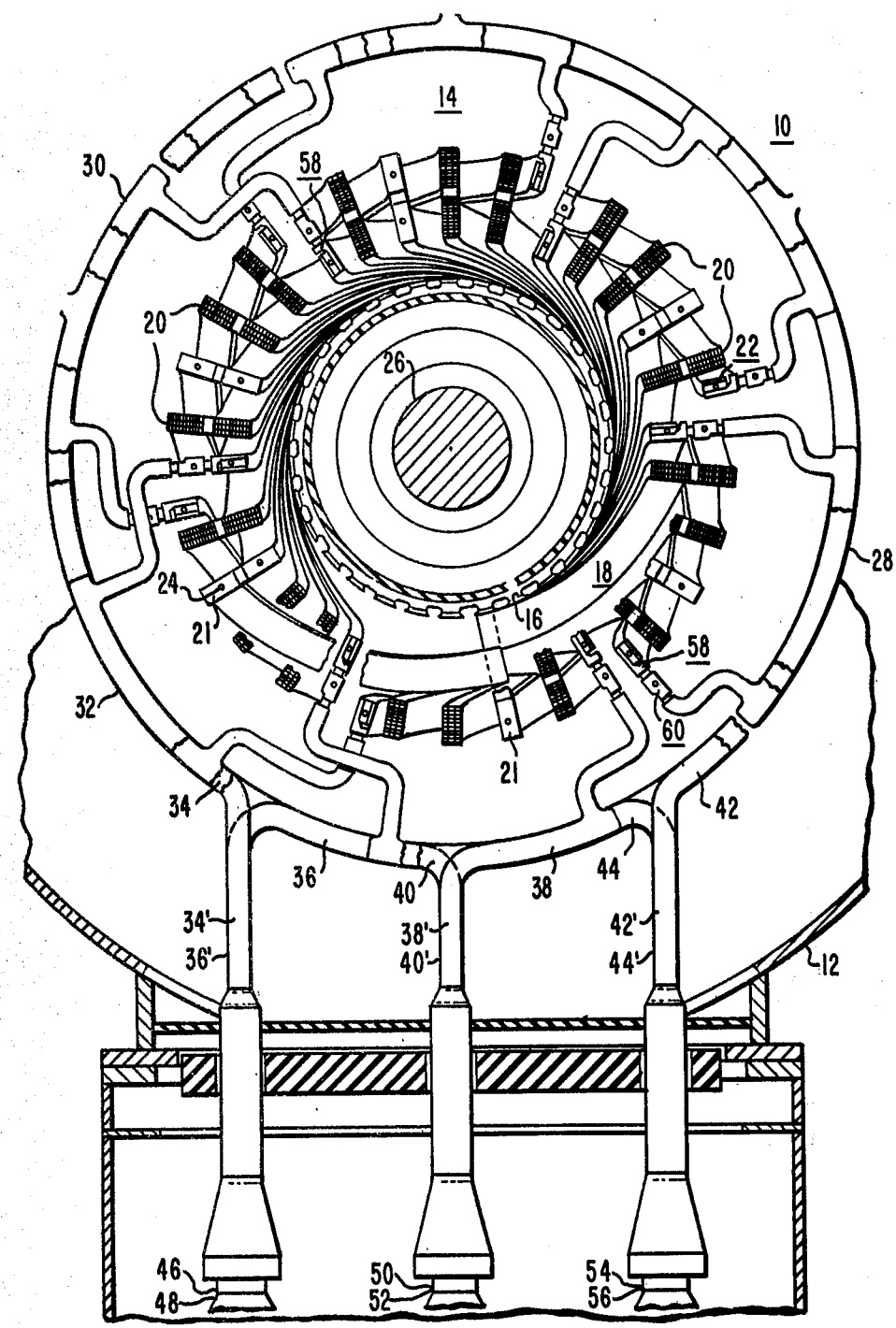
FIG. 1 is a transverse sectional end view of an exemplary turbine generator in which the invention is incorporated.

FIG. 1 illustrates a generator 10 having an outer housing 12 which surrounds and encloses a laminated stator core 14 of usual construction supported within housing 12 in any suitable manner. Stator core 14 is, by example, provided with longitudinal slots 16 in the usual manner for the reception of stator winding coils 18. The stator winding coils 18 are of the liquid cooled type and comprise hollow conductors 20 having internal passageways which open to coolant headers 22 which manifold coolant through the internal passageways. Headers 22 have been deleted for clarity purposes from the ends of most of the illustrated stator coils 18, but it is to be understood that such headers, for liquidly cooled stator coils, are preferably connected to the ends of all coils 18 for coolant collection from and distribution to hollow conductors 20. Coolant supply and discharge manifolds (neither of which is shown in FIG. 1) are fluidly connected to headers 22 through header nipples 24. Rotor member 26 is disposed within stator core 14 and has a field winding distributed thereon of any suitable type.

Stator winding coils 18 of the exemplary machine include a suitable number of half coils or coil sides, two half coils typically being disposed in each of the slots 16 and being connected together at the ends of most coils to form the complete dynamoelectric machine's winding. The illustrated stator winding 18 has three phase group coils which provide one phase of its three phase electrical supply. Each phase group includes, by example, two phase zones which are connected by parallel phase rings 28, 30 and 32. It will be understood that all stator half coils except those constituting the terminal portions of the six phase zones are connected in series with each other at their ends at both the axial front and back of the machine by conventional winding-series connectors between appropriate top and bottom half coils. Main leads 34', 36', 38', 42', and 44', connected to parallel phase rings 34, 36, 38, 40, 42, and 44, pass through housing 12 and are connected to external bushings 46, 48, 50, 52, 54, and 56. Individual phase leads 58 extend generally radially from the parallel phase rings to the coil terminal portions of the six phase zones. Specifically, phase leads 58 are electrically connected between the appropriate terminal coil portion's coolant headers 22 and parallel phase ring headers 60.

Figure 2:
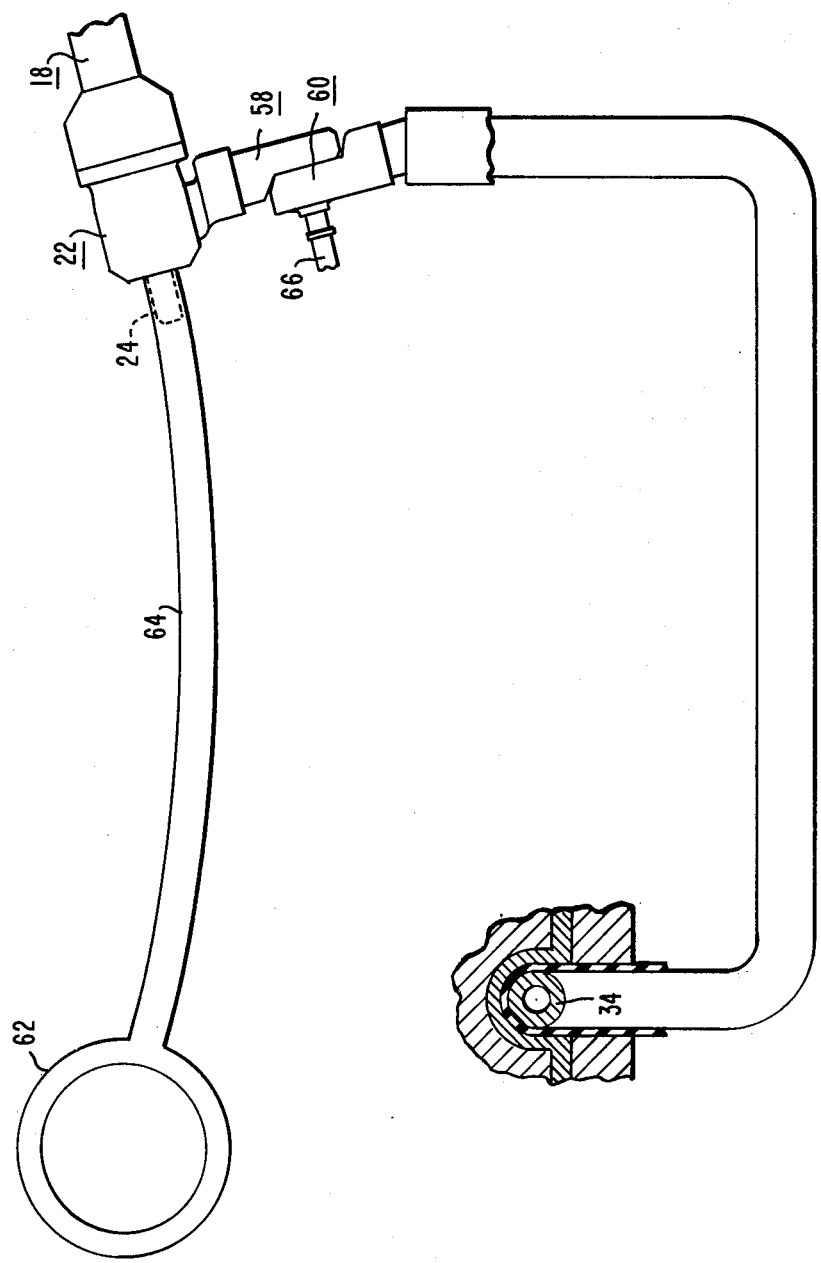
FIG. 2 is a partial sectional view of a portion of the turbine generator of FIG. 1 taken 90° therefrom so as to illustrate relative positioning of parallel phase rings and stator coil terminating portions and their phase lead interconnection.

FIG. 2 is a partial sectional view of a typical phase lead ring taken from FIG. 1 illustrating its connection with a typical terminating coil portion, also taken from FIG. 1. The remaining phase lead rings and their connections have been ommitted for the sake of clarity. By example, parallel phase ring header 60 of parallel phase ring 34 is electrically connected to header 22 of coil 18's terminating portion. Coolant manifold 62 provides coolant through connecting conduit 64 to coil header nipple 24. Parallel phase ring header 60 receives coolant through nipple 66 which, for purposes of the present invention, may be fluidly connected to illustrated coolant manifold 62 or any other source of coolant.

Figure 3A:
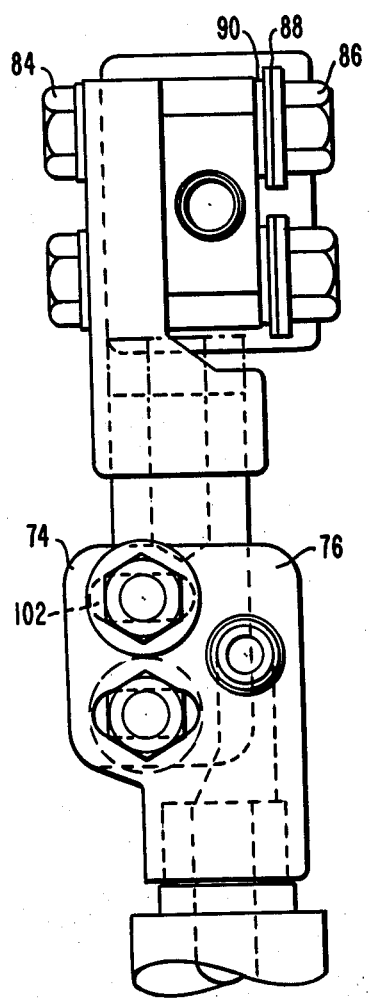
FIGS. 3A and 3B are elevation views taken 90° apart of an exemplary stator coil header, parallel phase header, and the electrically interconnecting phase lead.
Figure 3B:
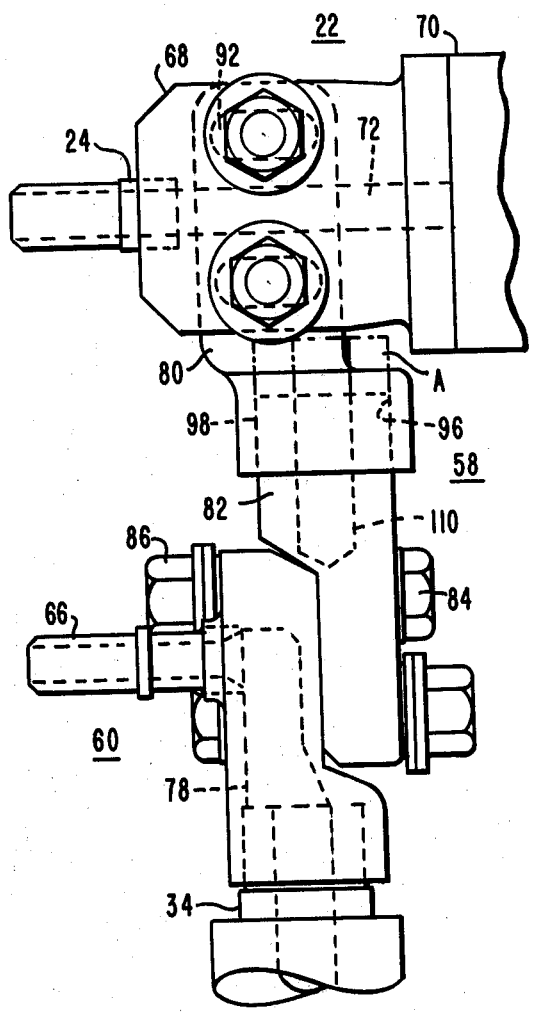
Figure 4A:
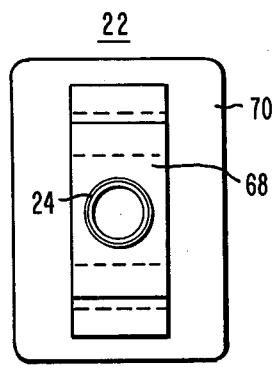
FIGS. 4A and 4B are elevation views taken 90° apart of the stator coil header of FIGS. 3A and 3B.
Figure 4B:
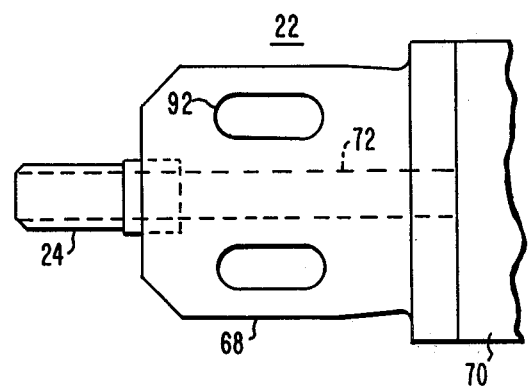
Figure 5A:
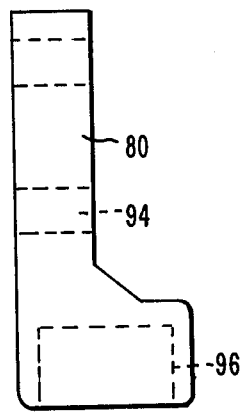
FIGS. 5A and 5B are elevation views taken 90° apart of a phase lead component which is connectable with the stator coil header of FIGS. 4A and 4B.
Figure 5B:
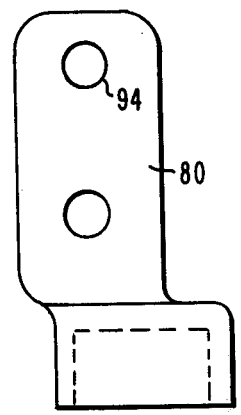
Figure 6A:
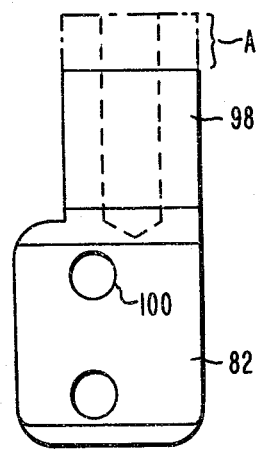
FIGS. 6A and 6B are elevation views taken 90° apart of a second phase lead component which is connectable to one end with the phase lead component illustrated in FIGS. 5A and 5B.
Figure 6B:
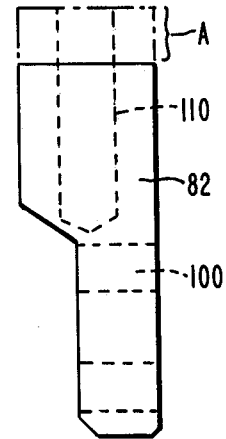
Figure 7A:
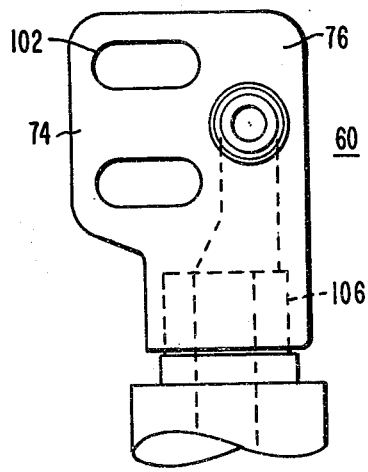
FIGS. 7A and 7B are elevation views taken 90° apart of a parallel phase ring header which is securable to the second phase lead component illustrated in FIGS. 6A and 6B.
Figure 7B:
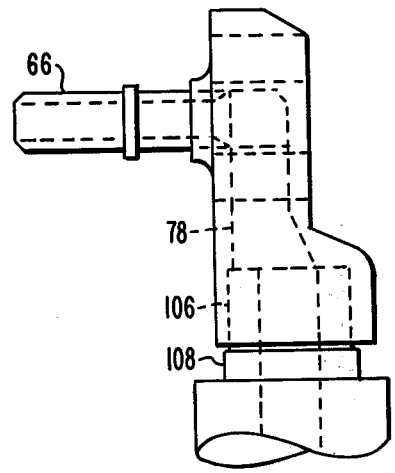

FIGS. 3A and 3B are elevation views of a typical terminating coil portion header 22, parallel ring header 60, and interconnecting phase lead 58. Coil header 22 includes electrical phase lead contact portion 68 and coolant chamber 70. Coolant supplied to nipple 24 enters chamber 70 through opening 72 formed in contact portion 68. Similarly, header 60 of parallel phase ring 34 constitutes a phase lead clamping portion 74 and a fluid transmission portion 76. Coolant supplied to nipple 66 passes through opening 78 in fluid transmission portion 76 and enters internally cooled parallel phase ring 34. Phase lead 58 includes a first component 80 for electrically connecting contact portion 68 to a second component 82 which, in turn, electrically connects component 80 to clamping portion 74 of parallel phase ring header 60. Coil header 22, better illustrated in FIGS. 4A and 4B, is secured to phase lead coil component 80, better illustrated in FIGS. 5A and 5B, preferably by bolts 84 and nuts 86 which are in threaded engagement therewith. Exemplary spring washers 88 and flat washer 90 are disposed between nut 86 and header contact portion 68. Bolts 84 are received in slotted openings 92 and holes 94 respectively disposed in contact portion 68 and phase lead coil component 80. Phase lead component 80 has hole 96 formed on one end thereof for rotatably mating with cylindrical portion 98 of phase lead component 82 in closely spaced encompassing relationship therewith. Phase lead component 82 has holes 100 formed therein which are generally alignable with slots 102 formed in header clamping portion 74. Bolts 84 are receivable in generally aligned slots 102 and holes 100 and are preferably secured in place by nuts 86. Round hole 106 formed in one end of phase ring header 60 surrounds cylindrical phase ring portion 108. Slots 92 and 102 are elongated in mutually perpendicular directions and are sufficiently large in the non-elongated direction to permit slight rotation of phase lead 58 relative to either of its connected headers. Hole 96 and its mateable, cylindrical portion 98 are relatively rotatable during assembly about hole 96's longitudinal axis. Portion A, illustrated in phantom in FIGS. 3A, 3B, 6A, and 6B, is trimmed to the proper length at assembly time to adjust the overall length of phase lead 58 to match the actual separation distance between the connectable coil and phase ring. The longitudinal axis of hole 96 is formed perpendicular to the elongation directions of slots 92 and 102.

After assembly, phase lead components 80 and 82 are preferably brazed together at their rotatably mateable interface to insure optimum electrical contact and sufficient mechanical integrity. Phase lead components 80 and 82 have plane surfaces which mate with plane surfaces on coil contact portion 68 and clamping portion 74 on header 60. Solder is preferably disposed between the plane, mateable surfaces to insure sufficient electrical contact area therebetween. Opening 110 in component 82 may be provided for phase lead weight reduction. The presence, size, and location of opening 110 are primarily determined by natural frequency and mechanical stress considerations.

The various rotative and translational features of phase lead 58 insures optimum electrical contact and mechanical mateability with the coil and phase lead ring headers 22 and 60 respectively. Since three translational and three rotational degrees of freedom are provided, virtually all reasonable misalignments between headers 22 and 60 may be accounted for. Additionally, phase leads 58 are made as short and stiff as possible to insure relatively high natural frequencies. Utilization of such short phase leads obviates the need for internally cooling them since both ends thereof are in sufficient thermal contact with the coolant headers to provide cooling of the phase leads 58 by heat conduction through their ends to the coolant passing thereby.

It will now be apparent that an improved phase lead has been provided which has a relatively high natural frequency, requires no internal cooling, and accommodates relatively large assembly misalignments between the connectable coil and phase ring headers.

We claim:

1. A dynamoelectric machine comprising:
   a stator member;
   a plurality of electrical coils cooperatively associated with said stator member, said coils constituting a stator winding with each coil having two terminating ends, said coils having internal passageways through which fluid coolant is transmissable;
   a plurality of arcuate shaped phase rings disposed on at least one axial end of said stator, said phase rings having internal passageways through which fluid coolant is transmissable;
   a plurality of coil headers connected to said coil terminating ends for manifolding coolant through the coil's internal passageways, said coil headers each including a contact portion having at least one opening therein;
   a plurality of phase ring headers connected to said phase rings for manifolding fluid coolant through said ring's internal passageways, said phase ring headers each including a clamping portion having at least one opening therein;
   a plurality of phase leads for electrically connecting said ring and coil headers, each of said phase leads comprising:
      a first component having a hole and at least one opening therein, said first component being mateable with one of said coil headers when said component's opening is generally aligned with the mateable coil header's opening to form a first pair of openings wherein at least one of said first pair of openings constitutes a slot which is elongated in a first direction and
      a second component having a cylindrical portion and at least one opening therein, said second component being mateable with one of said ring headers, said second component's opening being generally alignable with the mateable ring header's opening to form a second pair of openings wherein at least one of said second pair of openings constitutes a slot which is elongated in a second direction which is perpendicular to said first direction, said cylindrical portion being insertable in said hole in a direction perpendicular to said first and second directions; and
      a plurality of fasteners receivable in said aligned openings for securing said phase leads to said ring and coil headers.

2. The dynamoelectric machine of claim 1 wherein said ring headers each include a hole whose longitudinal axis is substantially parallel to the longitudinal axis of said first component's hole, each of said ring header's holes accepting a cylindrical portion of said ring.

3. The dynamoelectric machine of claim 1 wherein said phase lead components mate with said coil and ring headers along plane surfaces.

4. The dynamoelectric machine of claim 3 wherein solder is disposed between the mateable plane surfaces of the phase lead components and headers.

5. The dynamoelectric machine of claim 1 wherein brazing compound is disposed between said phase lead's mateable hole and cylindrical portion for securing said phase lead components together.

* * * * *